Figure 1:
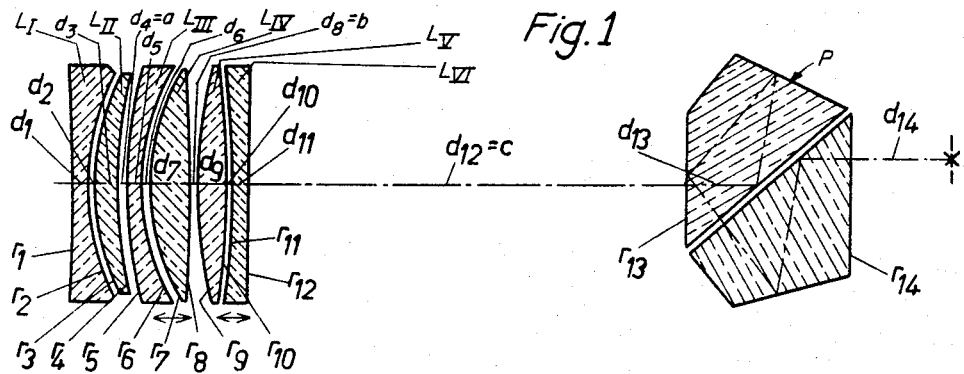

United States Patent Office 3,286,592
Patented Nov. 22, 1966

3,286,592
OBJECTIVE WITH CONTINUALLY VARIABLE FOCAL LENGTH AND FIXED IMAGE PLANE
Helmut Wagner, 14 Siechhofstrasse, Wetzlar (Lahn), Germany, and Adolf Sterlepper, 35 Oberdorfstrasse, Steindorf, Wetzlar, Germany
Filed Oct. 14, 1965, Ser. No. 495,946
Claims priority, application Germany, Apr. 22, 1961, H 42,386
1 Claim. (Cl. 88—57)

The invention relates to an optical objective of a continually variable focal length and a fixed image plane and constitutes a continuation-in-part of application Serial No. 199,210, filed on the 23rd day of April 1962. An optical objective of this type requires a uniformly good correction over a large range of focal lengths as well as for a suitable aperture ratio e.g. of about 1:4.5. Up to now this object could be achieved only with an objective comprising a great number of lenses.

It is an object of the present invention to provide an optical objective accomplishing these requirements by a combination of only a small number of lenses.

It is a further object of the invention to provide an optical objective consisting of at least three members, the first member being a dispersing one, the second and the third being collecting ones and at least the two latter members being capable of being axially displaced for the purpose of varying the focal length of the objective, whereby the focal length of the second member is shorter than the focal length of the third member.

In accordance with the invention the first member of the optical objective consists of at least two lenses, and at least one of them is a positive lens. If said member comprises two lenses only, there is provided a positive lens as the second one. Furthermore, the positive component of the first member is preferably of meniscus shape and its convex surface faces the object. The negative component of the first member is biconcave. The radius of curvature of said convex surface of the first member is longer than the longest focal length of the entire objective regarded in absolute values. The radius of curvature of the surface averted from the object, however, is longer than the shortest and shorter than the median focal length of the entire objective.

The second member also consists of at least two lenses, and at least one of them is a negative lens. If said member comprises two lenses only, there is provided a negative lens as the first one. The negative component is of meniscus shape, and its convex surface faces the object. The positive component of the second member is biconvex. Furthermore, the radius of curvature of the surface of the positive component of the second member facing away from the object is longer than the shortest focal length of the entire objective and shorter than the median focal length of the entire objective. The radius of curvature of the other convex surface of the positive component of the second member is longer than the median and shorter than the longest focal length of the entire system taken in absolute values.

The third member also consists of at least two lenses, and at least one of them is a negative lens. If said member comprises two lenses only, there is preferably provided a negative lens as the second one. The positive component of the third member is preferably biconvex. The radius of curvature of the surface of the third member facing the object is longer than the shortest and shorter than the median focal length of the entire objective. The negative component of the third member has a radius of curvature $r_{12}$ at the side facing away from the object which is preferably longer than the fourfold median focal length of the entire objective, regarded in absolute values.

According to another object of the invention, the lenses of the individual members may be cemented together.

It is still another object of the invention to provide the objective with at least two axially displaceable members so that the image plane remains fixed when the focal length is varied. Preferably, the first member is fixedly arranged and the second and the third member are capable of being axially displaced independently of each other, or the second and the third member are fixedly combined so as to be axially displaceable as a unit, in which event the first member must be axially movable by itself.

A further object of the invention is to arrange one or two further members behind the third member.

It depends upon the use of the objective which one of its members has to be axially displaceable. If the objective is used for binoculars for obtaining a continuous enlargement, the first member will preferably be stationary while the second and third members will be made displaceable individually. The displacement may be kept smaller than the 0.7-fold amount of the attainable focal length variation $f_{max} - f_{min}$.

When the objective of the invention is to be used as a binocular objective, there is usually arranged an image reversing prism system behind the objective. This prism system takes part in the image correction as a further (fourth) member and therefore it is to be considered when computing the data.

Figure 2:
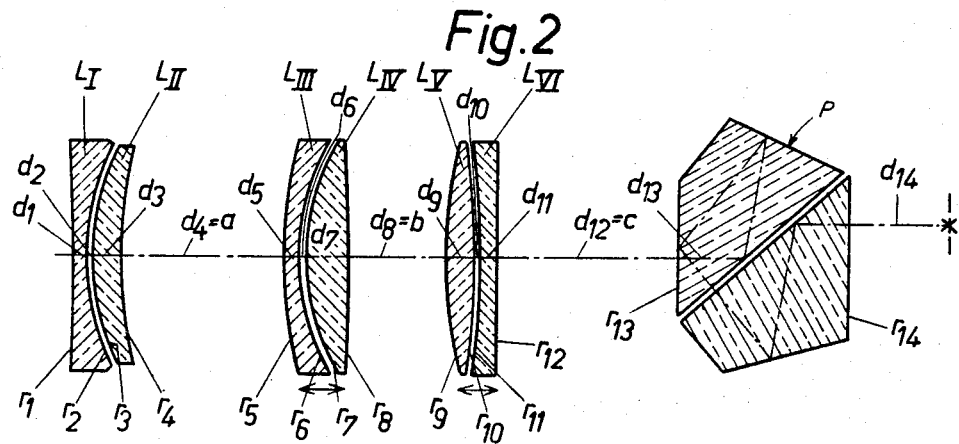
Figure 3:
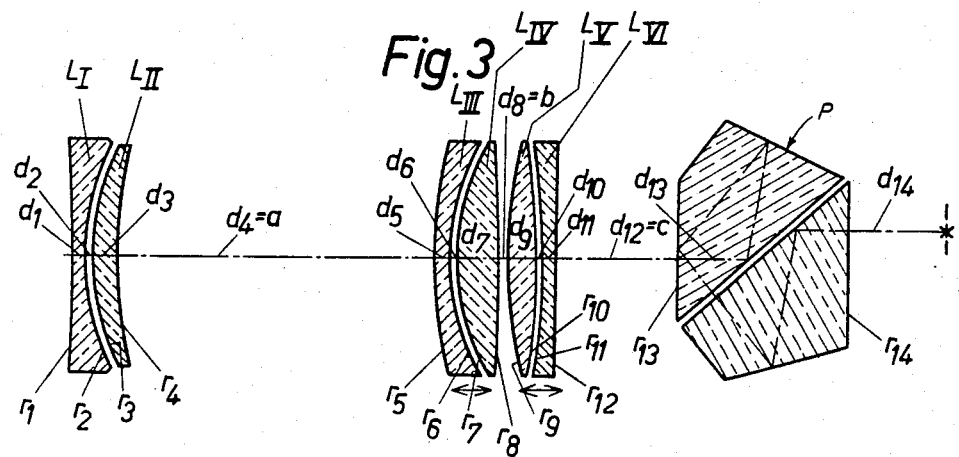

The drawings illustrate by way of example in the FIGS. 1, 2 and 3 an embodiment of the invention, namely a binocular objective whose members are shown in three different positions of magnification which are obtained by an axial displacement of the second and third members as indicated by the double arrows.

Figure 4:
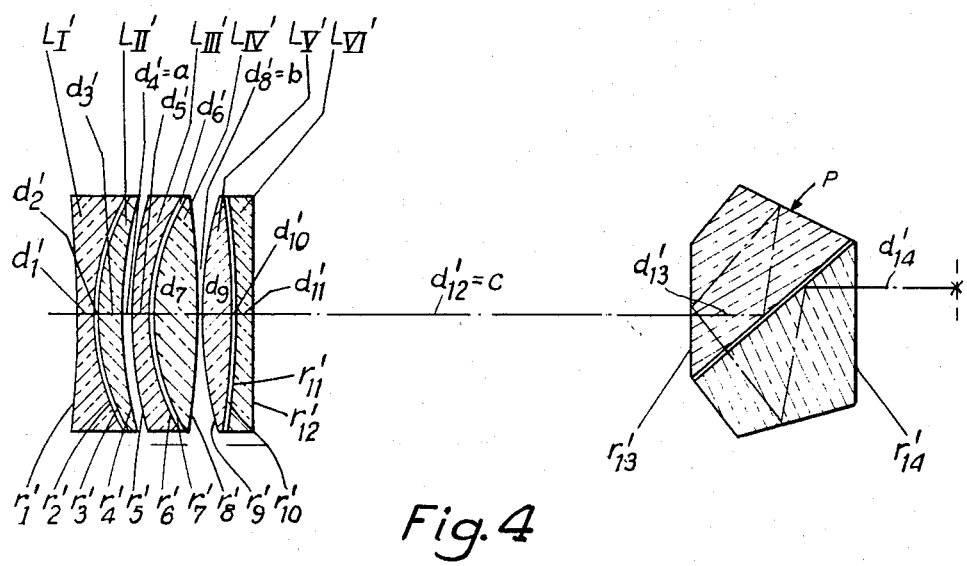
Figure 5:
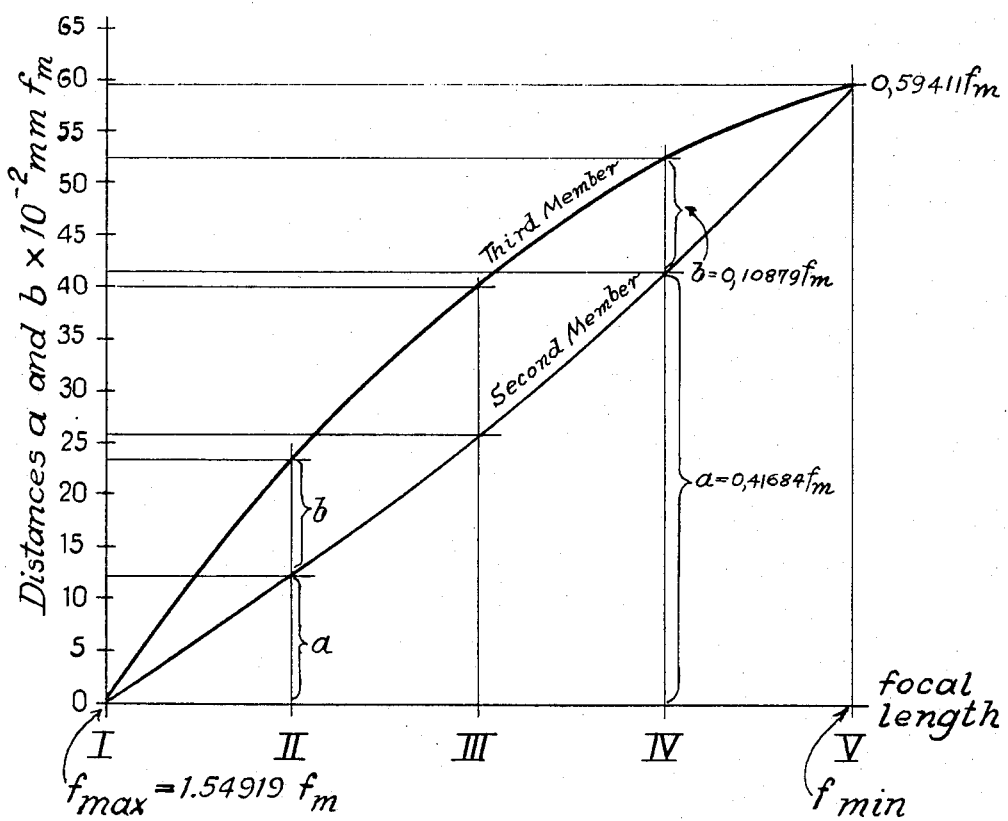

FIG. 4 illustrates an objective in which the lenses of each of the three members are cemented together, and FIG. 5 is a graph indicating the continuously varying air separation between the members when the focal length of the objective is varied.

In the drawing $L_I$ and $L_{II}$ designate the lenses of the first, fixed member, $L_{III}$ and $L_{IV}$ designate the lenses of the second, displaceable member, $L_V$ and $L_{VI}$ designate the lenses of the third, displaceable member, and P designates the prism system. The data of the components of this objective are given in the following table. In the latter the refractive indices for the red hydrogen line C are indicated by $n_C$, the ones for the yellow helium line $d$ by $n_d$, and the ones for the blue hydrogen line F by $n_F$. The median focal length of the entire objective is designated with $f_m$. The variable distances of the single members or axial spacings required for the focal length variation are designated with $a$, $b$ and $c$. The distance of the image plane from the light exit surface of the prism is designated with $d_{14}$. In the table the single members of the prism system are not indicated but only the entire light path within the glass is designated with $d_{13}$.

The design data correspond to the values of the following table or lie so close to these values that none of the curvatures $1/r$ and none of the zenith distances differ by more than the amounts given in parentheses below the principal data given in the table, and none of the refractive indices differ by more than ±0.1 from the values given in the table.

| Lens | Curvatures $K=1/r$ | Zenith distance $d$ | Refractive indices | | |
|---|---|---|---|---|---|
| | | | $n_C$ | $n_d$ | $n_F$ |
| $L_I$ | $-0.46980/f_m$ (+0.4) (-0.15) | $d_1 = 0.03200 \cdot f_m$ (+0.2) (-0.030) | 1.66284 | 1.66755 | 1.67878 |
| | $+2.92184/f_m$ (+0.5) (-0.5) | $d_2 = 0$ (+0.05) | | | |
| $L_{II}$ | $+2.92184/f_m$ (+0.5) (-0.5) | $d_3 = 0.04120 \cdot f_m$ (+0.2) (-0.03) | 1.77607 | 1.78470 | 1.80613 |
| | $+1.30514/f_m$ (+0.2) (-0.3) | $d_4 = a$ | | | |
| | $+1.26812/f_m$ (+0.2) (-0.2) | | | | |
| $L_{III}$ | | $d_5 = 0.03200 \cdot f_m$ (+0.2) (-0.030) | 1.66092 | 1.66680 | 1.68107 |
| | $+2.79846/f_m$ (+0.5) (-0.5) | $d_6 = 0$ (+0.05) | | | |
| | $+2.79846/f_m$ (+0.5) (-0.5) | | | | |
| $L_{IV}$ | | $d_7 = 0.07440 \cdot f_m$ (+0.2) (-0.05) | 1.56163 | 1.56470 | 1.57175 |
| | $-0.88496/f_m$ (+0.2) (-0.1) | $d_8 = b$ | | | |
| | $+1.30514/f_m$ (+0.2) (-0.3) | | | | |
| $L_V$ | | $d_9 = 0.04800 \cdot f_m$ (+0.2) (-0.04) | 1.55657 | 1.56013 | 1.56848 |
| | $-0.91075/f_m$ (+0.5) (-0.5) | $d_{10} = 0$ (+0.05) | | | |
| | $-0.91075/f_m$ (+0.5) (-0.5) | | | | |
| $L_{VI}$ | 0 (+0.2) (-0.2) | $d_{11} = 0.03200 \cdot f_m$ (+0.2) (-0.030) | 1.77607 | 1.78470 | 1.80613 |
| | 0 | $d_{12} = c$ | | | |
| Prism system. | 0 | $d_{13} = 1.02320 \cdot f_m$ (entire light path within the glass) $d_{14} = 0.10000 \cdot f_m$ | 1.51431 | 1.51680 | 1.52236 |

The following table shows numerical values for $a$, $b$ and $c$ for a few total focal lengths to which the objective may be adjusted.

| Focal lengths | $a$ | $b$ | $c$ |
|---|---|---|---|
| $f_{max} = 1.54919 \cdot f_m$ | $0.01366 \cdot f_m$ | $0.00400 \cdot f_m$ | $0.80341 \cdot f_m$ |
| $1.24467 \cdot f_m$ | $0.12244 \cdot f_m$ | $0.10879 \cdot f_m$ | $0.58984 \cdot f_m$ |
| $f_m = 1.00000 \cdot f_m$ | $0.25808 \cdot f_m$ | $0.14521 \cdot f_m$ | $0.41779 \cdot f_m$ |
| $0.80343 \cdot f_m$ | $0.41684 \cdot f_m$ | $0.10879 \cdot f_m$ | $0.29544 \cdot f_m$ |
| $f_{min} = 0.64550 \cdot f_m$ | $0.59411 \cdot f_m$ | $0.00400 \cdot f_m$ | $0.22296 \cdot f_m$ |

It will be noted that the range of focal length is $f_{max} - f_{min} = 2.4:1$.

Referring to FIG. 5, the graph indicates by means of the five Examples I, II, III, IV and V as given in the above table the effect of the continuously varying focal length from $f_{max} = 1.54919 \cdot f_m$ to $f_{min} = 0.64550 f_m$ on the variable air distance $a$ between the first and second member and the variable air distance $b$ between the second and third member. The values I, II, III, IV and V of the focal lengths are read off along the abscissa and the corresponding values of the distances $a$ and $b$ are read off along the ordinate of the graph.

What we claim is:

An optical objective of continually variable focal length comprising (a) a fixed first member composed of two components of which one is a positive lens which is arranged in rear of the other component which is a biconcave lens;

(b) a second member positioned to the rear of said first member and composed of two components of which the one in rear of said positive lens is a negative lens and the one in rear of the latter is a biconvex lens; and (c) a third member positioned to the rear of said second member and composed of two components of which the one in rear of said second member is a biconvex lens and the one in the rear of the latter is a negative lens;

(d) said second and third member being each axially displaceable independently with respect to each other, the amounts of displacement of said displaceable members being less than .7 times the amount of the obtainable focal length variation $f_{max} - f_{min}$, (e) the design data of the optical objective substantially corresponding to the values of the following table in which $L_I$ to $L_{VI}$ designate the successive lens elements in order of the incoming light, $1/r_1$ to $1/r_{12}$ designate the successive curvatures of the surfaces, $d_1$ to $d_{12}$ designate the successive zenith distances, and wherein $f_m$ indicates the median focal length of the entire optical objective, $n_C$ the refractive indices for the red hydrogen line C, $n_d$ the refractive indices for the yollow helium line $d$, $n_F$ the refractive indices for the blue hydrogen line F, while $a$, $b$ and $c$ are the variable distances between said members corresponding to the focal length variations:

| Lens | Curvature $K = 1/r$ | Zenith distance $d$ | Refractive Indices | | |
|---|---|---|---|---|---|
| | | | $n_T$ | $n_J$ | $n_F$ |
| $L_I$ | $1/r = 0.46980/f_m$ | $d_1 = 0.03200 \cdot f_m$ | 1.66284 | 1.66755 | 1.67878 |
| | $1/r_2 = +2.92194/f_m$ | $d_2 = 0$ | | | |
| $L_{II}$ | $1/r_3 = +2.92184/f_m$ | $d_3 = 0.04120 \cdot f_m$ | 1.77607 | 1.78470 | 1.80613 |
| | $1/r_4 = +1.30514/f_m$ | $d_4 = a$ | | | |
| $L_{III}$ | $1/r_5 = +1.26812/f_m$ | $d_5 = 0.03200 \cdot f_m$ | 1.66092 | 1.66680 | 1.67107 |
| | $1/r_6 = +2.79846/f_m$ | $d_6 = 0$ | | | |
| $L_{IV}$ | $1/r_7 = +2.79846/f_m$ | $d_7 = 0.07440 \cdot f_m$ | 1.56163 | 1.56470 | 1.57175 |
| | $1/r_8 = -0.88496/f_m$ | $d_8 = b$ | | | |
| $L_V$ | $1/r_9 = +1.30514/f_m$ | $d_9 = 0.04800 \cdot f_m$ | 1.55657 | 1.56013 | 1.56848 |
| | $1/r_{10} = -0.91075/f_m$ | $d_{10} = 0$ | | | |
| $L_{VI}$ | $1/r_{11} = -0.91075/f_m$ | $d_{11} = 0.03200 \cdot f_m$ | 1.77607 | 1.78470 | 1.80613 |
| | $1/r_{12} = 0$ | $d_{12} = c$ | | | |

References Cited by the Examiner

UNITED STATES PATENTS 696,788   4/1902   Allen _____ 88—57
2,896,498  7/1959   Brandon _____ 88—1

FOREIGN PATENTS 440,397   9/1934   Great Britain.

JEWELL H. PEDERSEN, *Primary Examiner.*

JOHN K. CORBIN, *Examiner.*

R. J. STERN, *Assistant Examiner.*

UNITED STATES PATENT OFFICE
CERTIFICATE OF CORRECTION

Patent No. 3,286,592 November 22, 1966

Helmut Wagner et al.

It is hereby certified that error appears in the above numbered patent requiring correction and that the said Letters Patent should read as corrected below.

In the heading to the printed specification, line 4, beginning with "Helmut Wagner" strike out all to and including "Wetzlar, Germany" in line 6, and insert instead -- Helmut Wagner, Wetzlar (Lahn), Germany, and Adolf Sterlepper, Steindorf, Wetzlar, Germany, assignors to Carl Zeiss-Stiftung, doing business as Carl Zeiss, Heidenheim on the Brenz, Wuerttemberg, Germany, a corporation of Germany --.

Signed and sealed this 28th day of November 1967.

(SEAL)
Attest:

EDWARD M. FLETCHER, JR.
Attesting Officer

EDWARD J. BRENNER
Commissioner of Patents